US012318768B2

(12) United States Patent
Zhan et al.

(10) Patent No.: US 12,318,768 B2
(45) Date of Patent: Jun. 3, 2025

(54) METHOD FOR MOLECULAR SIEVE SHAPING BY USING RICE HUSK AS TEMPLATE

(71) Applicant: Huaqiao University, Fujian (CN)

(72) Inventors: Guowu Zhan, Fujian (CN); Meiting Guo, Fujian (CN); Shufeng Zhou, Fujian (CN); Dongren Cai, Fujian (CN); Qingqing Xu, Fujian (CN); Jianbin Lin, Fujian (CN)

(73) Assignee: Huaqiao University, Quanzhou (CN)

( * ) Notice: Subject to any disclaimer, the term of this patent is extended or adjusted under 35 U.S.C. 154(b) by 0 days.

(21) Appl. No.: 19/008,931

(22) Filed: Jan. 3, 2025

(65) Prior Publication Data

US 2025/0135447 A1 May 1, 2025

Related U.S. Application Data

(63) Continuation of application No. PCT/CN2023/129579, filed on Nov. 3, 2023.

(30) Foreign Application Priority Data

Nov. 3, 2022 (CN) .......................... 202211383481.X

(51) Int. Cl.
| | |
|---|---|
| B01J 37/10 | (2006.01) |
| B01J 29/40 | (2006.01) |
| B01J 35/37 | (2024.01) |
| B01J 35/61 | (2024.01) |
| B01J 35/63 | (2024.01) |
| B01J 37/00 | (2006.01) |
| B01J 37/06 | (2006.01) |
| C01B 39/02 | (2006.01) |
| C01B 39/26 | (2006.01) |

(52) U.S. Cl.
CPC .......... B01J 37/0009 (2013.01); B01J 29/40 (2013.01); B01J 35/37 (2024.01); B01J 35/615 (2024.01); B01J 35/617 (2024.01); B01J 35/633 (2024.01); B01J 35/635 (2024.01); B01J 37/009 (2013.01); B01J 37/06 (2013.01); B01J 37/10 (2013.01); C01B 39/026 (2013.01); C01P 2006/12 (2013.01); C01P 2006/14 (2013.01); C01P 2006/21 (2013.01)

(58) Field of Classification Search
CPC ...... B01J 37/0009; B01J 37/009; B01J 37/06; B01J 37/10; B01J 35/615; B01J 35/633; B01J 35/635; B01J 35/617; B01J 35/37; C01B 39/026
See application file for complete search history.

(56) References Cited

FOREIGN PATENT DOCUMENTS

| | | | |
|---|---|---|---|
| CN | 1587209 A | | 3/2005 |
| CN | 1749161 A | * | 3/2006 |
| CN | 104923284 A | | 9/2015 |
| CN | 105330516 A | | 2/2016 |
| CN | 108187728 A | | 6/2018 |
| CN | 115845930 A | | 3/2023 |
| JP | 2010208872 A | | 9/2010 |

OTHER PUBLICATIONS

Corresponding International Patent Application No. PCT/CN2023/129579, International Search Report, date mailed Dec. 21, 2023, 8 pages.
Corresponding International Patent Application No. PCT/CN2023/129579, Written Opinion, date mailed Dec. 21, 2023, 10 pages.
Tianyu Xu, "Effect of Catalytic Cracking of Single Fatty Acids and Their Glycerides on Preparation of Hydrocarbons", China Oils and Fats, Dec. 31, 2020, vol. 45, Nr:3, pp. 22-27 with English abstract.
Corresponding Chinese Patent Application No. 202211383481.X, First Office Action, dated Jan. 18, 2024, 10 pages.
Corresponding Chinese Patent Application No. 202211383481.X, Notice of Grant of Patent, dated Mar. 1, 2024, 3 pages.

* cited by examiner

*Primary Examiner* — Yong L Chu
(74) *Attorney, Agent, or Firm* — Cooper Legal Group, LLC

(57) ABSTRACT

A method for using a molecular sieve shaped by rice husks as a template is provided. A method using a molecular sieve shaped by rice husks as a catalyst for a thermal cracking reaction for stearic acid is provided. A method for manufacturing a molecular sieve incorporating rice husks, the method includes the following steps. (1) mixing molecular sieve powder containing rice husks, a binder, and an extrusion aid to be homogeneous, then adding a peptizer, and mixing to be homogeneous to obtain a uniform mixture; (2) introducing water to the uniform mixture, mixing to be homogeneous, and performing a kneading process to shape a sticky conglomerate; (3) extruding the sticky conglomerate obtained in the step (2) with an extrusion device to obtain moist strips; and (4) drying, calcining, and shaping the moist strips obtained in the step (3) to obtain the molecular sieve incorporating the rice husks.

3 Claims, 2 Drawing Sheets

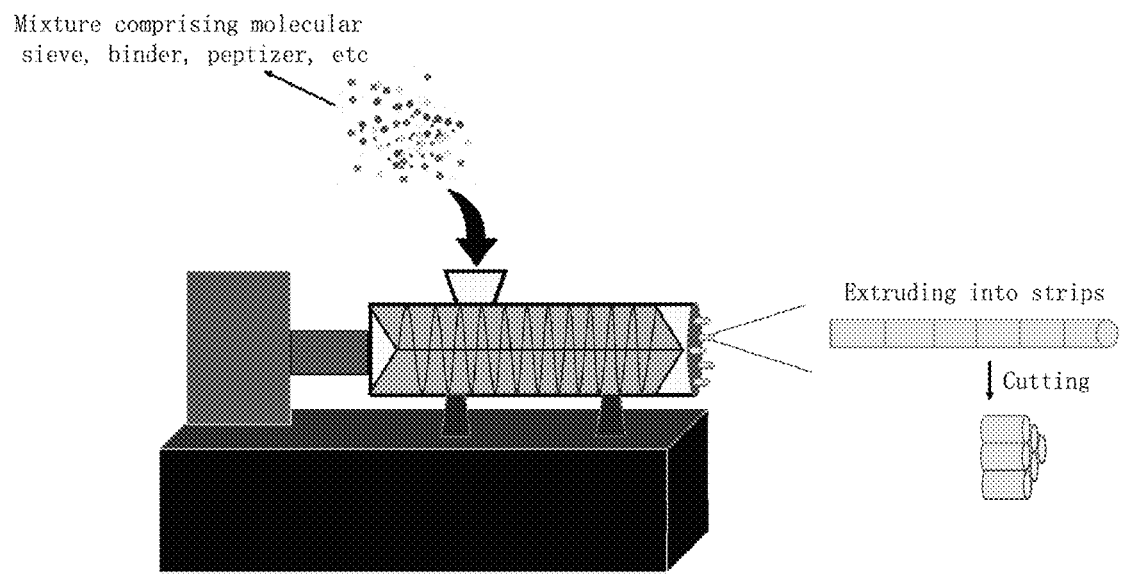
FIG. 1
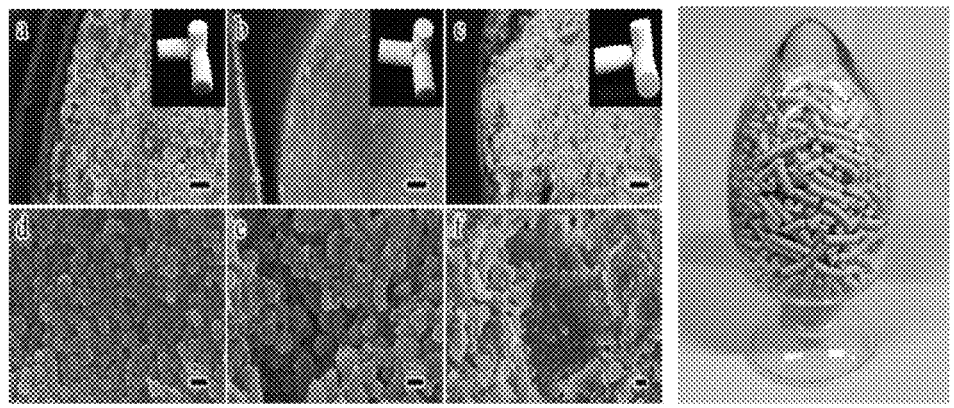
FIG. 2A  FIG. 2B  FIG. 2C
FIG. 2D  FIG. 2E  FIG. 2F  FIG. 2G

METHOD FOR MOLECULAR SIEVE SHAPING BY USING RICE HUSK AS TEMPLATE

RELATED APPLICATIONS

This application is a continuation of International Patent Application PCT/CN2023/129579, filed on Nov. 3, 2023, which claims priority to Chinese Patent Application 202211383481.X, filed on Nov. 3, 2022. International Patent Application PCT/CN2023/129579 and Chinese Patent Application 202211383481.X are incorporated herein by reference.

FIELD OF THE DISCLOSURE

The present disclosure relates to the technology field of shaping a molecular sieve, and in particular relates to a method for molecular sieve shaping by rice husks as a template.

BACKGROUND OF THE DISCLOSURE

Technologies for shaping molecular sieves are key steps for preparing multiphase catalysts. Generally, the molecular sieves are powders and have the several disadvantages: difficult to recycle, easily clog pipelines, large losses in filling the molecular sieves, and too low of mechanical strength for meeting transportation and reaction requirements. Therefore, the powders of the molecular sieves need to be manufactured into a shaped body with a preset shape, a preset size, and a preset strength to meet various industrial applications (such as the ability to resist filling impact, airflow impact, etc.). In addition, an inherent multilevel pore structure of a powder catalyst is the key to promote a process for shaping the molecular sieves and to improve mechanical properties of extrusion.

At present, the technologies for shaping the molecular sieves in industry mainly include extrusion molding, rotational molding, compaction molding, Spheronization, rotary molding, and compression molding. The extrusion molding is widely used due to the high degree automation of equipment, continuous operation, and sophistication of processes. The shaping process facilitates passage of materials via extrusion, allowing for control over shape of the extruded molecular sieves by modifying machine parts. The resulting forms of the extruded molecular sieves are strips, clover-leaf shapes, honeycomb structures, among others. The shaping process of the molecular sieves and subsequent mechanical and textural characteristics are influenced by a multitude of factors, such as granularity of raw powder of the catalyst, categories and quantities of binders, peptizers, extrusion aids, and pore expanders employed. Further, a ratio of water and powder and calcining conditions, which encompass variables, such as temperature, duration, and heating rate, are also critical in determining efficacy of the extruded molecular sieves.

A large amount of binder needs to be added in the process of shaping the molecular sieves to improve the mechanical strength and wear resistance of the extruded molecular sieves. During the process of shaping the molecular sieves, a peptization reaction occurs between the binders and the peptizers to bond the powder of the molecular sieves together. The commonly used binders are mainly silicon, aluminum, and magnesium binders. However, the addition of the binders will seriously affect the activity of the catalyst and will also harm the post-processing of the catalyst.

BRIEF SUMMARY OF THE DISCLOSURE

In order to solve the deficiencies of the existing techniques, the present disclosure provides a method for shaping a molecular sieve using rice husks as a template.

Another purpose of the present disclosure is to provide a method for shaping the molecular sieve as the catalyst template.

A first technical solution of the present disclosure is as follows.

A method for shaping a molecular sieve using rice husks as a template.

In a preferred embodiment of the present disclosure, the method comprises the following steps.
  (1) mixing molecular sieve powder containing rice husks, a binder, and an extrusion aid to be homogeneous, then adding a peptizer, and mixing to be homogeneous to achieve a uniform mixture;
  (2) introducing water to the uniform mixture, mixing to be homogeneous, and performing a kneading process to shape a sticky conglomerate;
  (3) extruding the sticky conglomerate obtained in the step (2) with an extrusion device to obtain moist strips; and
  (4) drying, calcining, and shaping the moist strips obtained in the step (3) to obtain the molecular sieve.

Further preferably, weight percentages of the molecular sieve powder containing the rice husks, the binder, and the extrusion aid are 72-75%: 7-25%: 2-20%.

Further preferably, an amount of the peptizer is 1-3 wt % of a total weight of a mixture of the molecular sieve powder containing the rice husks, the binder, and the extrusion aid.

Even further preferably, an amount of the water introduced in the step (2) is 32-34 wt % of a total weight of the uniform mixture.

A second technical solution of the present disclosure is as follows.

A method for shaping a molecular sieve as a catalyst, the method comprises the following steps.
  1) mixing molecular sieve powder containing rice husks, a binder, and an extrusion aid to be homogeneous, then adding a peptizer, and mixing to be homogeneous to achieve a uniform mixture;
  (2) introducing water to the uniform mixture, mixing to be homogeneous, and performing a kneading process to shape a sticky conglomerate;
  (3) extruding the sticky conglomerate obtained in the step (2) with an extrusion device to obtain moist strips; and
  (4) drying, calcining, and shaping the moist strips obtained in the step (3) to obtain the molecular sieve.

In a preferred embodiment of the present disclosure, weight percentages of the molecular sieve powder containing rice husks, the binder, and the extrusion aid are 72-75%: 7-25%: 2-20%.

Further preferably, an amount of the peptizer is 1-3 wt % of a total weight of a mixture of the molecular sieve powder containing rice husks, the binder, and the extrusion aid.

Further preferably, an amount of the water introduced in the step (2) is 32-34 wt % of a weight of the uniform mixture.

Even further preferably, in the step (4), the drying and the calcining comprises drying at 79-82° C. for 100-120 minutes and calcining at 400-800° C. for 4-8 hours after heating at a heating rate of 10-20° C. per minute.

The technical solution has the following advantages. The present disclosure uses rice husks as a template. The method enhances the mechanical strength of the catalyst during a process for forming the molecular sieve as a catalyst, and refines textural properties of the catalyst. The present disclosure reduces a cost of the binder and facilitates the comprehensive utilization of biomass waste, thereby advancing environmental conservation. Even with a reduced application of the binder and the peptizer, the resulting molecular sieve with rice husk templates exhibits superior mechanical strength compared to molecular sieve extrusions that do not incorporate rice husk templates.

BRIEF DESCRIPTION OF THE DRAWINGS

FIG. 1 illustrates a flow chart of the process of the present disclosure.

FIGS. 2A and 2D illustrate scanning electron microscope (SEM) images of a formation of a nanoscale molecular sieve formation in the absence of the rice husks, FIGS. 2B and 2E illustrate SEM images of a nanoscale molecular sieve formation with the rice husks, FIGS. 2C and 2F illustrate SEM images of a microscale molecular sieve formation with the rice husks, and FIG. 2G illustrates the nano-scale molecular sieve formation with the rice husks.

DETAILED DESCRIPTION OF THE EMBODIMENTS

Figure 3:
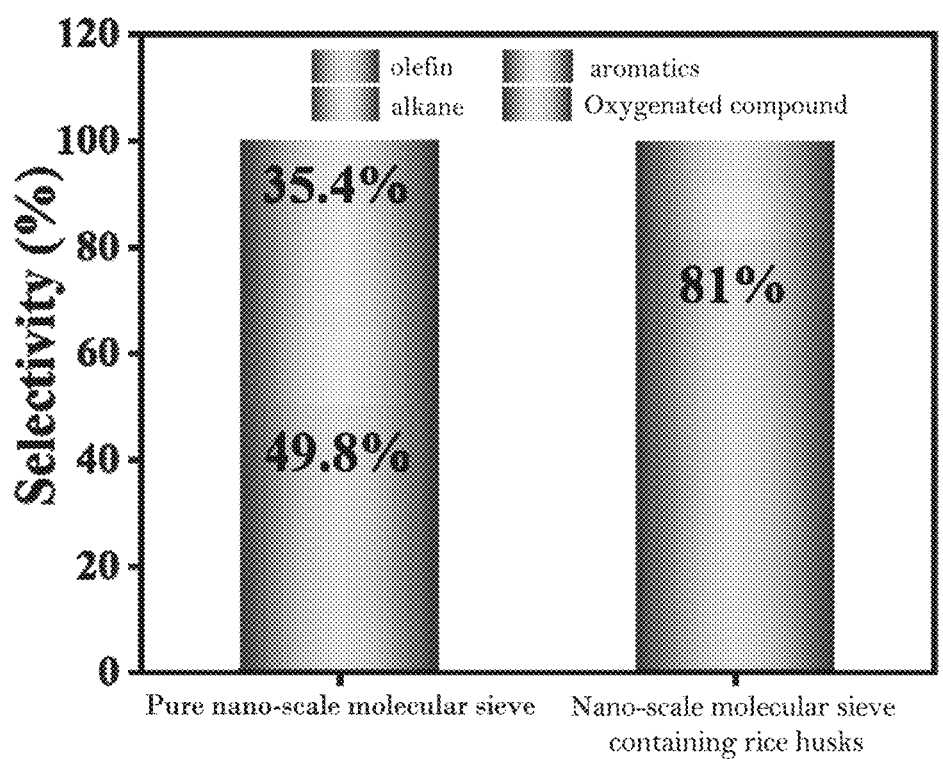
FIG. 3 illustrates a comparison of the selectivity of pure nanoscale molecular sieve and the nanoscale molecular sieve containing rice husks that function as thermal cracking catalysts for stearic acid.

The technical solution of the present disclosure will be further described and illustrated below in combination with the accompanying drawings and embodiments.

Comparative Embodiment 1

(1) A method for preparing Zeolite Socony Mobil-5 (ZSM-5) powder involves a sequential mixing of water, a tetrapropylammonium hydroxide solution (with a 40% concentration of tetrapropylammonium hydroxide by weight), sodium metaaluminate, and tetraethyl orthosilicate in a weight ratio of 79:46:1:77 to obtain a first mixture, and the first mixture is then subjected to a high-temperature hydrothermal reaction at 170° C. for 24 hours to produce a sample. The sample is washed with deionized water, centrifuged, dried at 80° C., and finally calcined in a muffle furnace at 550° C. for 6 hours after heating at a heating rate of 5° C. per minute.

(2) 73.5 wt % of the ZSM-5 powder, 24.5 wt % of binder (pseudo-boehmite), and 2 wt % of extrusion aid (*sesbania*) are mixed to be homogeneous, and a peptizer (nitric acid) with 3 wt % of a total weight of a second mixture of the ZSM-5 powder, the binder, and the extrusion aid is then added and mixed to be homogeneous by a stirring rod or a mixer to produce a uniform mixture. Water equivalent to 32.5 wt % of the uniform mixture is added to the uniform mixture and mixed to be homogeneous, and a kneading process is performed for 20 minutes with a kneader to form a sticky conglomerate.

(3) The sticky conglomerate obtained in the step (2) is extruded into moist strips by an extrusion device with an extrusion rotation speed of the extruder adjusted to 50 revolutions/minute. The moist strips rest at room temperature (e.g., 20-25° C.) for 20 minutes and are cut to a uniform length of 6 mm.

(4) The moist strips obtained in the step (3) are dried at 80° C. for 120 minutes, calcined at 670° C. for 6 hours after being heated with a heating rate of 13° C./minute, and then polished into regular cylindrical forms with dimensions of 5×3 mm for testing. A process for shaping a molecular sieve of the ZSM-5 is shown in FIG. 1.

Embodiment 1

A flow chart illustrating a process of this embodiment is shown in FIG. 1. In the step (2), The ZSM-5 powder is replaced with the ZSM-5 powder containing rice husks (as a template). A method for shaping the ZSM-5 powder containing the rice husks is as follows: water, tetrapropylammonium hydroxide solution with a 40% concentration of tetrapropylammonium hydroxide by weight, sodium metaaluminate, tetraethyl orthosilicate, and the rice husks are mixed in a weight ratio of 79:46:1:77:15 in sequence to obtain a third mixture, and the third mixture undergoes a high-temperature hydrothermal reaction at 170° C. for 24 hours to produce a sample. The sample is then washed with deionized water and ethanol, subjected to centrifugation, dried at 80° C., and calcined in a muffle furnace at 550° C. for 6 hours after being heated at a rate of 5° C. per minute. The remainder of this embodiment aligns with Comparative Example 1.

Embodiment 2

In the step (2), the weight content of the binder is modified to 18.75%, and the amount of the peptizer is modified to 2.25% of the total weight of the third mixture of the ZSM-5 powder containing the rice husks, the binder, and the extrusion aid. The remainder of this embodiment aligns with Embodiment 1.

Embodiment 3

In the step (2), the weight content of the binder is modified to 16.67%, and the amount of the peptizer is modified to 2% of the total weight of the third mixture of the ZSM-5 powder containing the rice husks, the binder, and the extrusion aid. The remainder of this embodiment aligns with Embodiment 1.

Embodiment 4

In the step (2), the weight content of the binder is modified to 12.5%, and the amount of the peptizer is modified to 1.5% of the total weight of the third mixture of the ZSM-5 powder containing the rice husks, the binder, and the extrusion aid. The remainder of this embodiment aligns with Embodiment 1.

Embodiment 5

In the step (2), the weight content of the binder is modified to 8.33%, and the amount of the peptizer is modified to 1% of the total weight of the third mixture of the ZSM-5 powder containing the rice husks, the binder, and the extrusion aid. The remainder of this embodiment aligns with Embodiment 1.

The technical effects of the products obtained in Comparative Embodiment 1 and Embodiments 1-5 are compared and shown in Table 1 described below.

TABLE 1

The technical effects of the products obtained in Comparative Embodiment 1 and Embodiments 1-5

| | Specific surface area ($m^2/g$) | Aperture (nm) | Pore volume ($cm^3/g$) | Average compressive strength (N) |
|---|---|---|---|---|
| Comparative Embodiment 1 | 605 | 1.5 | 0.39 | 14.6 |
| Embodiment 1 | 432 | 0.7 | 0.47 | 63.6 |
| Embodiment 2 | 522 | 0.7 | 0.39 | 48.1 |
| Embodiment 3 | 606 | 0.7 | 0.40 | 54.3 |
| Embodiment 4 | 683 | 0.7 | 0.53 | 47.7 |
| Embodiment 5 | 476 | 0.7 | 0.25 | 32.6 |

Embodiment 6: Functions of the Rice Husks in the Mechanical Strength of the Catalysts of the Molecular Sieve of the ZSM-5

As shown in FIGS. 2A, 2B, 2C, 2D, 2E, 2F, and 2G, the incorporation of the rice husks facilitates a more uniform adhesion of the molecular sieve of the ZSM-5, acting as an interfacial binder, thereby suggesting that the rice husks can serve as binders in conjunction with silicon to enhance the cohesion of molecular sieve particles of the ZSM-5. Furthermore, silicon can function as a carrier and dispersant for catalysts with some studies reporting an enhancement in the mechanical strength of extrusions through the addition of silicon powder. Consequently, the silicon content within the rice husks exerts a substantial influence on bolstering the mechanical strength of molecular sieve extrusions of the ZSM-5. As shown in Table 2, the addition of the rice husks is conducive to improving mechanical properties.

Scanning electron microscopy (SEM) images of molecular sieve formations of the ZSM-5 incorporating the rice husks are as follows. FIGS. 2A and 2D illustrate SEM images of the nanoscale molecular sieve formation absent from the rice husks, FIGS. 2B and 2E illustrate SEM images of a nanoscale molecular sieve formation with the inclusion of the rice husks, and FIGS. 2C and 2F illustrate SEM images of a of a micro-scale molecular sieve formation with the inclusion of the rice husks.

TABLE 2

Mechanical properties of different molecular sieves of the ZSM-5

| Sample | Mean (N) | Standard deviation (N) | Weibull parameters | | | Fracture load with a specific probability of failure (N) | | |
|---|---|---|---|---|---|---|---|---|
| | | | (m) | $F_0(N)$ | $R^2$ | $F_{1\%}$ | $F_{5\%}$ | $F_{10\%}$ |
| nanoscale ZSM-5 (no rice husks) | 14.56 | 2.27 | 7.586 | 20.8 | 0.953 | 8.5 | 10.5 | 11.5 |
| nanoscale ZSM-5 with the rice husks | 63.47 | 16.09 | 4.6786 | 69.1 | 0.952 | 25.9 | 36.6 | 42.7 |
| microscale ZSM-5 with the rice husks | 84 | 12.61 | 7.92 | 35.6 | 0.946 | 49.9 | 61.3 | 67.2 |

Embodiment 7: Functions of the Rice Husks in a Formation Composition and Mechanical Strength of a Catalyst As shown in Table 3, the incorporation of the rice husks into the synthesized catalyst samples indicates a trend where mechanical strength of extrusions of the catalyst decreases with the reduction of the binder and the peptizer. However, even when of the binder proportion is reduced to ⅓ of the initial composition, the molecular sieve of the ZSM-5 containing the rice husks exhibits a mechanical strength of 32.6 N, which is more than twice the 14.56 N observed for the extrusion of the catalyst lacking the rice husks. Consequently, the inclusion of the rice husks can significantly reduce the quantities of the binder and the peptizer required for the extrusion of the catalyst, leading to a substantial decrease in the formulation cost of the catalyst.

TABLE 3

Mechanical properties of different molecular sieves of the ZSM-5

| Amount of the binder and the peptizer | Mean (N) | Standard deviation (N) | Weibull parameters | | | Fracture load with specific probability of failure (N) | | |
|---|---|---|---|---|---|---|---|---|
| | | | (m) | $F_0$(N) | $R^2$ | $F_{1\%}$ | $F_{5\%}$ | $F_{10\%}$ |
| Comparison (samples without rice husks) | 14.56 | 2.27 | 7.6 | 20.8 | 0.953 | 8.5 | 10.5 | 11.5 |
| ⅓ | 32.6 | 7.96 | 4.8 | 35.6 | 0.96 | 13.63 | 19.1 | 22.2 |
| ½ | 47.68 | 8.46 | 6.65 | 51.1 | 0.92 | 25.6 | 32.7 | 36.5 |
| ⅔ | 54.34 | 9.41 | 6.87 | 58.2 | 0.92 | 29.8 | 37.8 | 41.9 |
| ¾ | 48.1 | 8.73 | 6.35 | 51.8 | 0.95 | 25.1 | 32.4 | 36.3 |
| 1 | 63.47 | 16.09 | 4.7 | 69.1 | 0.952 | 25.9 | 36.6 | 42.7 |

FIG. 3 is a comparative analysis of the selectivity between pure nanoscale molecular sieve and nanoscale molecular sieve containing the rice husks as a template, both utilized as thermal cracking catalysts for stearic acid.

The findings reveal that the molecular sieve prepared with the rice husks as a template exhibits an improved olefin selectivity in the thermal cracking products. The adjustment is attributed to an adjustment of pores after the formation of the two molecular sieves.

The preceding description is merely preferred embodiments of the present disclosure, but the scope of the present disclosure is not limited to these embodiments. Thus, the present disclosure is intended to encompass all equivalent variations and modifications provided they are made without departing from the claims and the specification provided in the present disclosure.

What is claimed is:

1. A method for preparing a molecular sieve comprising the following steps:
    (1) mixing ZSM-5 molecular sieve powder incorporated with rice husks, a binder, and an extrusion aid with weight percentages of 72-75%: 7-25%: 2-20% to be homogeneous, then adding a peptizer, and mixing to be homogeneous, an amount of the peptizer is 1-3 wt % of a total weight of a mixture of the ZSM-5 molecular sieve powder incorporated with the rice husks, the binder, and the extrusion aid, wherein a method for preparing the ZSM-5 molecular sieve powder incorporated with the rice husks comprises: mixing water, a tetrapropylammonium hydroxide solution with a concentration of 40 wt %, sodium metaaluminate, tetraethyl orthosilicate, and the rice husks to be homogeneous in sequence with a weight ratio of 79:46:1:77:15; subjecting to a hydrothermal reaction at 170° C. for 24 hours to yield an obtained sample; and washing the obtained sample with deionized water and ethanol, subjecting to centrifugation, drying at a constant temperature of 80° C., and then calcining in a muffle furnace at 550° C. for 6 hours at a heating rate of 5° C. per minute;
    (2) introducing water to the material obtained in the step (1), mixing to be homogenous, and performing a kneading process to form a sticky conglomerate;
    (3) extruding the sticky conglomerate obtained in the step (2) with an extrusion device to obtain moist strips; and
    (4) drying, calcining, and shaping the moist strips obtained in the step (3).

2. The method according to claim 1, wherein an amount of the water introduced in the step (2) is 32-34 wt % of a total weight of the material obtained in the step (1).

3. The method according to claim 1, wherein, in the step (4), the drying and the calcining comprises drying at 79-82° C. for 100-120 minutes and calcining the moist strips at 400-800° C. for 4-8 hours after heating the moist strips at a heating rate of 10-20° C. per minute.

* * * * *